(12) United States Patent
Wang et al.

(10) Patent No.: US 8,925,971 B2
(45) Date of Patent: Jan. 6, 2015

(54) CONNECTING ASSEMBLY AND METHODS FOR USING THE SAME

(71) Applicants: Hanlin Wang, Shandong (CN); Zhongxian Wang, Shandong (CN)

(72) Inventors: Hanlin Wang, Shandong (CN); Zhongxian Wang, Shandong (CN)

(*) Notice: Subject to any disclaimer, the term of this patent is extended or adjusted under 35 U.S.C. 154(b) by 0 days.

(21) Appl. No.: 13/659,243

(22) Filed: Oct. 24, 2012

(65) Prior Publication Data
US 2013/0043673 A1   Feb. 21, 2013

(51) Int. Cl.
*F16L 19/06* (2006.01)
*F16L 41/14* (2006.01)
*F16L 19/025* (2006.01)
*F16L 19/04* (2006.01)

(52) U.S. Cl.
CPC ............... *F16L 41/14* (2013.01); *F16L 19/025* (2013.01); *F16L 19/04* (2013.01)
USPC ............................. 285/196; 285/258; 285/338

(58) Field of Classification Search
USPC .................................. 285/196, 258, 109, 338
See application file for complete search history.

(56) References Cited

U.S. PATENT DOCUMENTS

| | | | | |
|---|---|---|---|---|
| 2,071,478 A | * | 2/1937 | Wick | 285/258 |
| 2,146,756 A | * | 2/1939 | Miller | 285/258 |
| 2,855,003 A | * | 10/1958 | Thaxton | 285/123.1 |
| 3,211,476 A | * | 10/1965 | Wagner | 285/258 |
| 3,421,782 A | * | 1/1969 | Hulick et al. | 285/258 |
| 3,490,793 A | * | 1/1970 | Wagner | 285/258 |
| 3,709,260 A | * | 1/1973 | Windle | 285/114 |
| 3,841,667 A | * | 10/1974 | Sands | 285/192 |
| 3,973,789 A | * | 8/1976 | Kunz et al. | 285/196 |
| 4,006,923 A | * | 2/1977 | Wagner | 285/258 |
| 4,411,458 A | * | 10/1983 | Strunk et al. | 285/196 |
| 5,687,998 A | * | 11/1997 | Pan | 285/338 |

FOREIGN PATENT DOCUMENTS

| | | |
|---|---|---|
| CN | 1276047 | 12/2000 |
| CN | 200993286 | 12/2007 |
| CN | 102042449 | 5/2011 |
| CN | 102128330 | 7/2011 |
| CN | 201934822 | 8/2011 |
| CN | 201954164 | 8/2011 |
| DE | 10047758 | 5/2001 |
| EP | 1373782 | 1/2004 |

* cited by examiner

*Primary Examiner* — David E Bochna
(74) *Attorney, Agent, or Firm* — Hamre, Schumann, Mueller & Larson, P.C.

(57) ABSTRACT

A thin-wall tube connecting assembly includes a connecting bar, and a tightening nut connected to the connecting bar through threads. The connecting bar is in a hollow tube-shape. One end of the connecting bar includes an expansion cone having an exterior diameter that is larger than that of other parts of the connecting bar. Another end of the connecting bar includes exterior threads. An elastic tube sits between the expansion cone of the connecting bar and a tightening nut. A rigid ring wraps around the exterior of the elastic tube, which shares a same axis with the tightening nut. A tube to be connected has an interior diameter that is equal to or larger than the exterior diameter of the expansion cone of the connecting bar. The rigid ring has an interior diameter that is equal to or larger than an exterior diameter of the tube to be connected.

6 Claims, 4 Drawing Sheets

CONNECTING ASSEMBLY AND METHODS FOR USING THE SAME

FIELD

This disclosure is related to a thin-wall tube connecting assembly. Specifically, this disclosure relates to a thin-wall tube connecting assembly that can be used to seal the connections of elastic materials.

BACKGROUND

Tubes usually connect to each other through screw threads. However, tapping threads on tubes requires special tools and the process is time consuming. Many tubes made with materials that are soft, thin, or elastic, e.g., plastic tubes and aluminum tubes, cannot be tapped. Regular quick-snap connection kits do not provide sufficient sealing capability. The tubes massively used in manufacture and daily life have smooth inner and outer surfaces. Regular quick-snap connection kits usually cannot achieve tightly sealed connections for those tubes. Moreover, to connect a tube to a wall of a water tank of a solar-powered water heater, a hole can be drilled on the wall of the tank, and then nuts can be used to secure the connection. However, this installation method requires works to be done on both sides of the wall of the water tank. That says, the tubes have to be connected to an exterior side of the wall; the nuts have to be secured to the interior side of the wall. Often times, the inner chambers of water tanks, small opening bottles, or buckets do not have enough room for a human hand to work in, resulting difficulties in fastening the nut. Given the examples mentioned, it should be obvious that there are needs for a convenient, quick, secure, and reliable means to make tightly sealed connections between elastic tubes, PPR tubes and the thin-wall containers.

SUMMARY

This disclosure illustrates embodiments of thin-wall tube connecting assemblies which can achieve convenient, quick, secure, reliable, and tightly sealed tube connections. Using the embodiments disclosed, the sealed connection can be done on just one end of a tube, satisfying needs for specific situations.

This disclosure provides the following embodiments:

A thin-wall tube connecting assembly includes a connecting bar (3). The connecting bar (3) is in a hollow tube-shape in the connecting bar (3). One end of the connecting bar (3) includes an expansion cone. The expansion cone includes an exterior diameter that is larger than that of other parts of the connecting bar (3). Another end of the connecting bar (3) includes exterior threads. A tightening nut (2) connects to the connecting bar (3) through screw threads. An elastic tube (4) sits between the expansion cone of the connecting bar (3) and the tightening nut (2). The elastic tube (4) has an interior diameter that matches with an exterior diameter of the connecting bar when there is no external force. The elastic tube (4) has an exterior diameter that is equal to or smaller than the exterior diameter of the expansion cone of the connecting bar (3) when there is no external force. A rigid ring (5) wraps around the exterior of the elastic tube (4). The rigid ring shares a same axis with the tightening nut (2). A tube to be connected (1) has an interior diameter that is equal to or larger than the exterior diameter of the expansion cone of the connecting bar (3). The rigid ring has an interior diameter that is equal to or larger than an exterior diameter of the tube to be connected (1).

The rigid ring is separate from the tightening nut (2), the tightening nut (2) has an exterior diameter larger than the interior diameter of the rigid ring.

An upper end of the rigid ring is configured adjacent to a lower end of the tightening nut (2).

The cross section of the wall of the elastic tube (4) forms a wedge with a reduced thickness from the top to the bottom of the elastic tube (4).

An inner side of an end surface of the tightening nut (2) facing the elastic tube (4) has an annular protruding step. The annular protruding step has an interior diameter and an exterior diameter that match to the interior diameter and the exterior diameter of the elastic tube (4), respectively, when there is no external force.

The embodiments of the thin-wall tube connecting assemblies disclosed can achieve convenient, quick, secure, reliable, and tightly sealed tube connections. Using the embodiments disclosed, the sealed connection can be done on just one end of a tube, satisfying needs for specific occasions.

DETAILED DESCRIPTION

Figure 1:
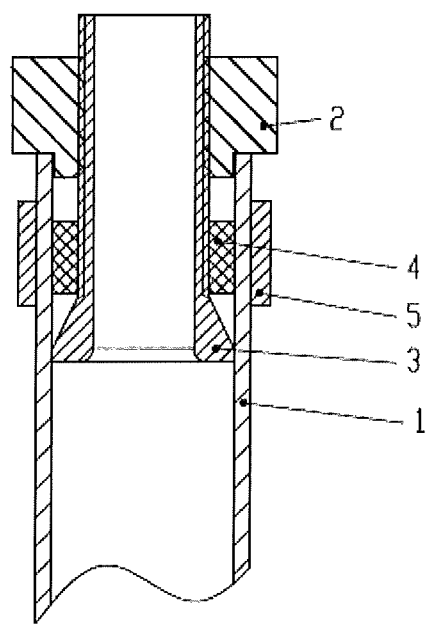
FIG. 1 is a schematic plot of one embodiment of this disclosure.

As shown in FIG. 1, this disclosure discloses a thin-wall tube connecting assembly which includes a connecting bar (3). The connecting bar (3) is in a hollow tube-shape in the connecting bar (3). One end of the connecting bar (3) includes an expansion cone. The expansion cone includes an exterior diameter that is larger than that of other parts of the connecting bar (3). Another end of the connecting bar (3) includes exterior threads. A tightening nut (2) connects to the connecting bar (3) through screw threads. An elastic tube (4) sits between the expansion cone of the connecting bar (3) and the tightening nut (2). A rigid ring (5) wraps around the exterior of the elastic tube (4). The elastic tube (4) can be made of elastic materials, such as, plastic or rubber. The elastic tube (4) can also be made of metals or alloys which have good malleability, such as copper or aluminum. The rigid ring (5) can be made of materials with reasonable rigidity, such that the shape of the ring will not easily change.

Figure 2:
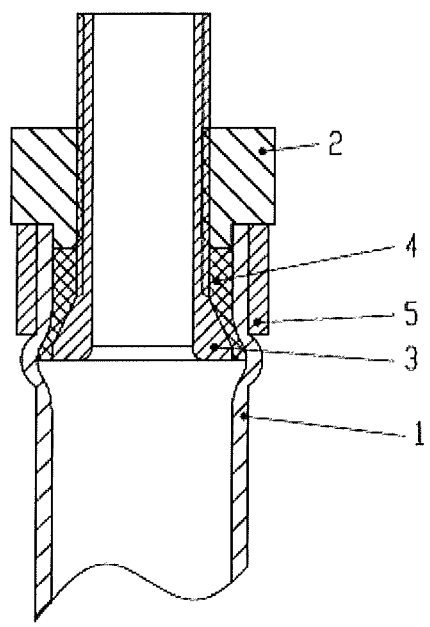
FIG. 2 is an example when an embodiment in FIG. 1 is in use.
Figure 3:
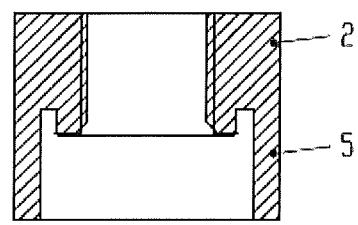
FIG. 3 is a schematic plot of another embodiment illustrating a tightening nut (2) and a rigid ring.

The rigid ring (5) can be configured as an independent component as shown in FIGS. 1 and 2. The rigid ring (5) can also be integrated to the tightening nut (2) to form a one piece component. The rigid ring (5) shares a same axis with the tightening nut (2). An upper surface of the rigid ring (5) is configured to be adjacent to a lower surface of the tightening nut (2).

Figure 4:
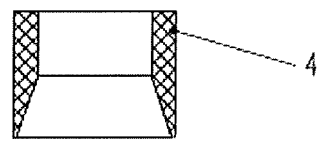
FIG. 4 is a schematic plot of another embodiment illustrating an elastic tube (4).
Figure 5:
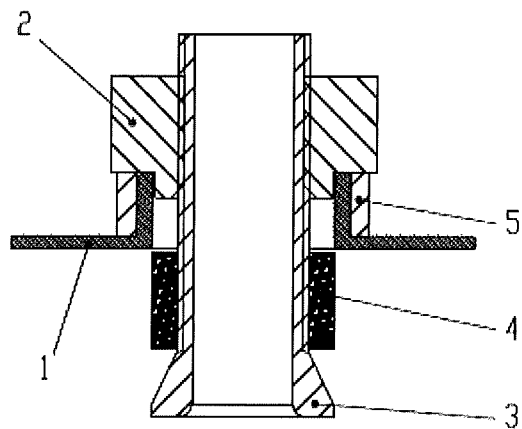
FIG. 5 is a schematic plot of a third embodiment when it is not in use.
Figure 6:
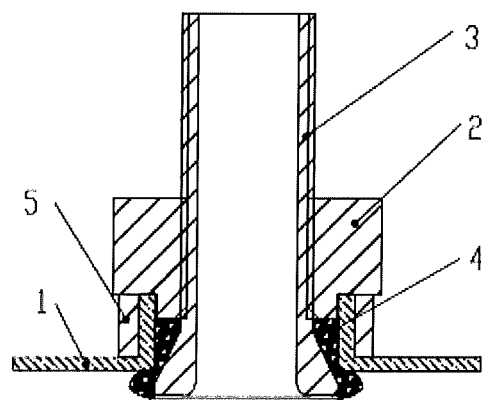
FIG. 6 is an example when an embodiment in FIG. 5 is in use.

The elastic tube (4) can be configured in a tube shape. The elastic tube (4) can also be configured in a cone shape as shown in FIG. 4.

An end surface of the tightening nut (2) facing the elastic tube (4) has an annular protruding step. The annular protruding step has an interior diameter and an exterior diameter that match the interior diameter and the exterior diameter of the elastic tube (4) with a reasonable tolerance, respectively, when there is no external force. The function of the annular protruding step is to provide a structure that can tightly press on the elastic tube (4) without interferences. Moreover, the elastic tube (4) works with the rigid ring (5) to encircle an open end of a tube to be connected (1). This also prevents the open end of the tube to be connected (1) from collapsing. In another embodiment, if the tube to be connected (1) has sufficient rigidity, the tightening nut (2) can be configured without an annular protruding step.

In use, the maximum exterior diameter of the expansion cone of the connecting bar (3) is slightly smaller or equal to the interior diameter of the tube to be connected (1) such that the connecting bar (3) fits into the tube to be connected (1). The interior diameter of the rigid ring (5) is equal to or slightly larger than the exterior diameter of the tube to be connected (1), such that the tube to be connected (1) fits into the rigid ring (5). Without external force, the exterior diameter of the elastic tube (4) should be smaller than the maximum exterior diameter of the expansion cone of the connecting bar (3); in the best case, the two diameters equal to each other. The rigid ring (5) wraps around the tube to be connected (1); the connecting bar (3) combined with the elastic tube (4) fits into the tube to be connected (1); the elastic tube (4) fits into the thin-wall space defined by the connecting bar (3) and the tube to be connected (1); the tightening nut (2) is then rotated to further push down the elastic tube (4). Because the elastic tube (4) has the elasticity, it will be squeezed around the expansion cone of the connecting bar (3) by the tightening nut (2). As shown in FIG. 2, at this point, because the maximum exterior diameter of the expansion cone of the connecting bar (3) combining the thickness of the wall of the elastic tube (4) is larger than the interior diameter of the tube to be connected (1), the contacting section of the tube to be connected (1) is pushed outwardly. When the tightening nut (2) rotates downwardly, the rigid ring (5) also moves downwardly until the rigid ring (5) is stopped by the expansion cone of the connecting bar (3). At this point, the tightening nut (2) reliably secured the thin-wall tube connecting assembly to the end of the tube to be connected (1).

After the connecting bar (3) is secured, the remaining screw threads on the tightening nut (2) can be used to connect another tube. The interior chamber of connecting bar (3) makes the connection of the fluid in the connected tubes.

In addition, a connecting bar (3) with a wider diameter tapped with interior screw threads can be used to connect with a connecting bar (3) with a smaller diameter tapped with exterior screw threads. By connecting the two connecting bars through the screw threads, two tubes thereof each of them is installed with a thin-wall tube connecting assembly individually can be connected.

The invention claimed is:

1. A thin-wall tube connecting assembly comprising:
a connecting bar, the connecting bar is in a hollow tube-shape, one end of the connecting bar includes an expansion cone, the expansion cone includes an exterior diameter that is larger than that of other parts of the connecting bar, another end of the connecting bar includes exterior threads;
a tightening nut, the tightening nut connects to the connecting bar through screw threads;
an elastic tube, the elastic tube sits between the expansion cone of the connecting bar and the tightening nut, the elastic tube has an interior diameter that matches with an exterior diameter of the connecting bar when there is no external force, the elastic tube has an exterior diameter that is equal to or smaller than the exterior diameter of the expansion cone of the connecting bar when there is no external force;
a rigid ring, the rigid ring wraps around the exterior of the elastic tube, the rigid ring shares a same axis with the tightening nut; and
a tube to be connected, the tube to be connected has an interior diameter that is equal to or larger than the exterior diameter of the expansion cone of the connecting bar; the rigid ring has an interior diameter that is equal to or larger than an exterior diameter of the tube to be connected,
wherein an inner side of an end surface of the tightening nut facing the elastic tube has an annular protruding step, the annular protruding step has an interior diameter and an exterior diameter that match the interior diameter and the exterior diameter of the elastic tube, respectively, when there is no external force, and
wherein the annular protruding step is in direct contact with the elastic tube, when the tightening nut is fastened to the connecting bar.

2. The thin-wall tube connecting assembly in claim 1, wherein a cross section of a wall of the elastic tube has a reduced thickness from a top to a bottom of the elastic tube.

3. A thin-wall tube connecting assembly, comprising:
a connecting bar, the connecting bar is in a hollow tube-shape, one end of the connecting bar includes an expansion cone, the expansion cone includes an exterior diameter that is larger than that of other parts of the connecting bar, another end of the connecting bar includes exterior threads;
a tightening nut, the tightening nut connects to the connecting bar through screw threads;
an elastic tube, the elastic tube sits between the expansion cone of the connecting bar and the tightening nut, the elastic tube has an interior diameter that matches with an exterior diameter of the connecting bar when there is no external force, the elastic tube has an exterior diameter that is equal to or smaller than the exterior diameter of the expansion cone of the connecting bar when there is no external force;
a rigid ring, the rigid ring wraps around the exterior of the elastic tube, the rigid ring shares a same axis with the tightening nut; and
a tube to be connected, the tube to be connected has an interior diameter that is equal to or larger than the exterior diameter of the expansion cone of the connecting bar; the rigid ring has an interior diameter that is equal to or larger than an exterior diameter of the tube to be connected,
wherein the inner side of the end surface of the tightening nut facing the elastic tube has an annular protruding step, the annular protruding step has the interior diameter and the exterior diameter that match the interior diameter and the exterior diameter of the elastic tube, respectively, when there is no external force,
wherein the annular protruding step is in direct contact with the elastic tube, when the tightening nut is fastened to the connecting bar, and
wherein the rigid ring is separate from the tightening nut, the tightening nut has an exterior diameter larger than the interior diameter of the rigid ring.

4. The thin-wall tube connecting assembly in claim 3, wherein a cross section of a wall of the elastic tube has a reduced thickness from a top to a bottom of the elastic tube.

5. A thin-wall tube connecting assembly, comprising:

a connecting bar, the connecting bar is in a hollow tube-shape, one end of the connecting bar includes an expansion cone, the expansion cone includes an exterior diameter that is larger than that of other parts of the connecting bar, another end of the connecting bar includes exterior threads;

a tightening nut, the tightening nut connects to the connecting bar through screw threads;

an elastic tube, the elastic tube sits between the expansion cone of the connecting bar and the tightening nut, the elastic tube has an interior diameter that matches with an exterior diameter of the connecting bar when there is no external force, the elastic tube has an exterior diameter that is equal to or smaller than the exterior diameter of the expansion cone of the connecting bar when there is no external force;

a rigid ring, the rigid ring wraps around the exterior of the elastic tube, the rigid ring shares a same axis with the tightening nut; and a tube to be connected, the tube to be connected has an interior diameter that is equal to or larger than the exterior diameter of the expansion cone of the connecting bar; the rigid ring has an interior diameter that is equal to or larger than an exterior diameter of the tube to be connected, wherein the inner side of the end surface of the tightening nut facing the elastic tube has an annular protruding step, the annular protruding step has the interior diameter and the exterior diameter that match the interior diameter and the exterior diameter of the elastic tube, respectively, when there is no external force, wherein the annular protruding step is in direct contact with the elastic tube, when the tightening nut is fastened to the connecting bar, and wherein an upper end of the rigid ring is positioned adjacent to a lower end of the tightening nut.

6. The thin-wall tube connecting assembly in claim 5, wherein a cross section of a wall of the elastic tube has a reduced thickness from a top to a bottom of the elastic tube.

\* \* \* \* \*